United States Patent [19]

Sonne et al.

[11] Patent Number: 4,638,158
[45] Date of Patent: Jan. 20, 1987

[54] GAMMA RAY MEASUREMENT OF EARTH FORMATION PROPERTIES USING A POSITION SENSITIVE SCINTILLATION DETECTOR

[75] Inventors: Darrell S. Sonne, Katy; William J. Beard, Houston, both of Tex.

[73] Assignee: Halliburton Company, Duncan, Okla.

[21] Appl. No.: 571,897

[22] Filed: Jan. 18, 1984

[51] Int. Cl.⁴ .......................... G01V 5/00; G01T 1/20
[52] U.S. Cl. ..................................... 250/266; 250/264; 250/367
[58] Field of Search ................ 250/266, 264, 265, 367

[56] References Cited

U.S. PATENT DOCUMENTS

| | | | |
|---|---|---|---|
| 3,882,309 | 5/1975 | Paap | 250/264 |
| 3,978,337 | 8/1976 | Nickles et al. | 250/367 |
| 4,394,576 | 7/1983 | Yanaka et al. | 250/367 |

FOREIGN PATENT DOCUMENTS 2243035  3/1973  Fed. Rep. of Germany ...... 250/367

*Primary Examiner*—Richard Hanig
*Attorney, Agent, or Firm*—William J. Beard

[57] ABSTRACT

A well logging system for measuring the radial density distribution of earth formations in the vicinity of a well borehole is provided. The system utilizes a single position sensitive gamma ray detector capable of deriving formation bulk density using the gamma-gamma scattering technique a different radial distances from the well borehole.

8 Claims, 6 Drawing Figures

GAMMA RAY MEASUREMENT OF EARTH FORMATION PROPERTIES USING A POSITION SENSITIVE SCINTILLATION DETECTOR

BACKGROUND OF THE INVENTION

This invention relates to gamma ray scattering or gamma-gamma density well logging techniques and, more particularly, to such techniques for deriving a compensated formation bulk density by the use of a position sensitive scintillation detector.

It has become fairly common practice in the art of well logging to log the earth formations in the vicinity of a well borehole which is either cased or uncased with a gamma ray density instrument. Such an instrument comprises a source of gamma rays such as cesium 137 which are collimated and directed outwardly into the formation from the well logging sonde or tool which is lowered into the borehole on an electrical wireline. The gamma rays are scattered from the electrons of elements comprising the earth formations in the vicinity of the borehole. A separate gamma ray detector longitudinally spaced from the gamma ray source then is used to measure the intensity of scattered gamma rays from the materials surrounding the well borehole back into the instrument. More than one such detector may be used in order to provide a compensated density measurement which is compensated for the presence of mudcake or casing thickness intervening between the gamma ray source and the detector or detectors. An example of such a system is given in U.S. Pat. No. 4,297,575 which is assigned to the assignee of the present invention.

In the well logging system described in the aforementioned patent, the gamma ray source is positioned below two gamma ray detectors which are longitudinally spaced at different distances from the source. Gamma rays from the source are directed by a collimator into the earth formations in the vicinity of the wellbore. Scattered gamma rays returning from these formations are directed by collimators to the two detectors. In this system, the near spaced detector to the source is a Geiger-Mueller type counting tube and the far spaced detector is a sodium iodide thorium activated scintillation detector having a photomultiplier tube optically coupled thereto. The thickness of casing or mudcake may be determined by appropriate computations based on predetermined relationships existing between the count rate of scattered gamma rays in the short spaced detector to those in the long spaced detector. The count rate in the short spaced detector is much more influenced by material closer to the well borehole than that of the long spaced detector. By appropriately combining the count rates in the two detectors, which are spaced a known distance apart, and the use of a predetermined calibrated relationship between the formation bulk density and the count rates at the two detectors the formation density may be computed independently of the effects of the mudcake or casing intervening the distance between the scattered gamma rays from the source and the two detectors.

Certain problems are encountered in a system of the type described in the above referenced U.S. patent. These concern the sensitivity or relative sensitivity to gamma rays of the two different types of detectors and the spacing distance used to separate the detectors being related geometrically to the depth of investigation of the instrument into the earth formation surrounding the well borehole. It would be highly desirable to have a multiplicity of detectors located above the gamma ray source so that the formation bulk density at different radial distances from the well borehole could be investigated and a radial density cross-section of the earth formation in the vicinity of the borehole plotted as a function of borehole depth. It is a feature of the present invention that a single unique position sensitive scintillation detector is utilized together with a gamma ray source to provide measurements of formation bulk density at different radial distances from the well borehole and to compensate the measured formation densities for the effects of mudcake or intervening casing thickness and cement thicknesses between the well borehole and the surrounding earth formations. It is another feature of the present invention to be able to derive formation bulk density measurements at different radial distances from a well borehole and to plot such formation densities as a function of borehole depth. Yet another feature of the present invention comprises the ability to measure the scattered gamma ray energy dependent response from earth formations adjacent a well borehole at different radial distances from the well borehole with a single position sensitive radiation detector.

BRIEF DESCRIPTION OF THE INVENTION

In the gamma ray density logging system of the present invention, a downhole sonde is provided at its lower end with a gamma ray source which is collimated to direct gamma rays from the source outwardly into the earth formations in the vicinity of the well borehole. A single novel position sensitive radiation detector is longitudinally spaced above the gamma ray source in the instrument and is used to detect scattered gamma rays coming from different radial distances from the borehole into the formation. Plural collimators are used to direct gamma rays scattered from the earth formations to the single position sensitive gamma ray detector of the present invention. Dual photomultiplier tubes located at opposite ends of a cylindrical scintillation crystal are utilized to determine at what distance or position from a reference end of the crystal the gamma ray has impinged on the scintillation detector crystal. This information in turn may be related to gamma rays which have been scattered from different radial distances away from the well borehole. Density measurements of the formation bulk density based on different radial distances from the borehole may thus be determined. Two separate types of position sensitive radiation detectors for use in such a density logging system are disclosed herein. Either of these types of position sensitive radiation detectors may utilize dual photomultipliers positioned at opposite ends of a cylindrical or elongated scintillation crystal detector.

The invention may best be understood by reference to the following detailed description thereof when taken in conjunction with the accompanying drawings in which:

DETAILED DESCRIPTION OF THE INVENTION

Details of the techniques for determining compensated bulk density of earth formations the vicinity of a well borehole are given in the aforementioned U.S. Pat. No. 4,297,575. A discussion of the theory of scattered gamma ray or gamma-gamma density logging is included in this U.S. patent and will not be dwelled upon in detail herein. It will suffice to say that the same cross-plotting techniques for determining formation bulk density and which utilize scattered gamma rays from different radial distances into earth formations surrounding a well borehole can be used with the system of the present invention. By the use of a unique position sensitive radiation detector in the present system, a single longitudinal crystal having a length L may be substituted in place of the separate plural detectors used to sense scattered gamma rays from different radial distances in the formations in the aforementioned U.S. patent. The relative location or position along the length L of a detector crystal at which a particular gamma ray entering the crystal occurs may be determined with the position sensitive detectors of the present invention. Thus different radial depths of investigation may be investigated with this single detector. Using one type of detector the length distribution along the detector of gammas entering the detector may be determined continuously over the entire length of the detector. In a second type of detector which is also described herein, the position of gamma rays entering the detector crystal is divided into separate longitudinal bins or positions having different longitudinal distances from the gamma ray source. Thus using a single scintillation detecting crystal and a pair of photomultipliers at each end of the crystal the location into which partition or bin a particular gamma ray has been detected in the crystal may be determined.

The result of the use of such position sensitive scintillation detectors in a gamma gamma density measuring system in accordance with the concepts of the present invention is to provide measurements of scattered gamma rays occurring at a plurality of discrete or continuum of different radial distances from the well borehole. This can be utilized to provide a density cross section of the earth formations going away from the wall of the well borehole deeper into the formation forming the wall of the borehole.

By the use of a single position sensitive radiation detector in accordance with the concepts of the invention, the use of a multiplicity of individual detectors is avoided thereby simplifying the well logging system immensely in terms of the required electronic circuitry. Valuable information concerning the density cross-section at different radial distances from the well borehole is thus provided in accordance with the concepts of the present system.

Figure 1:
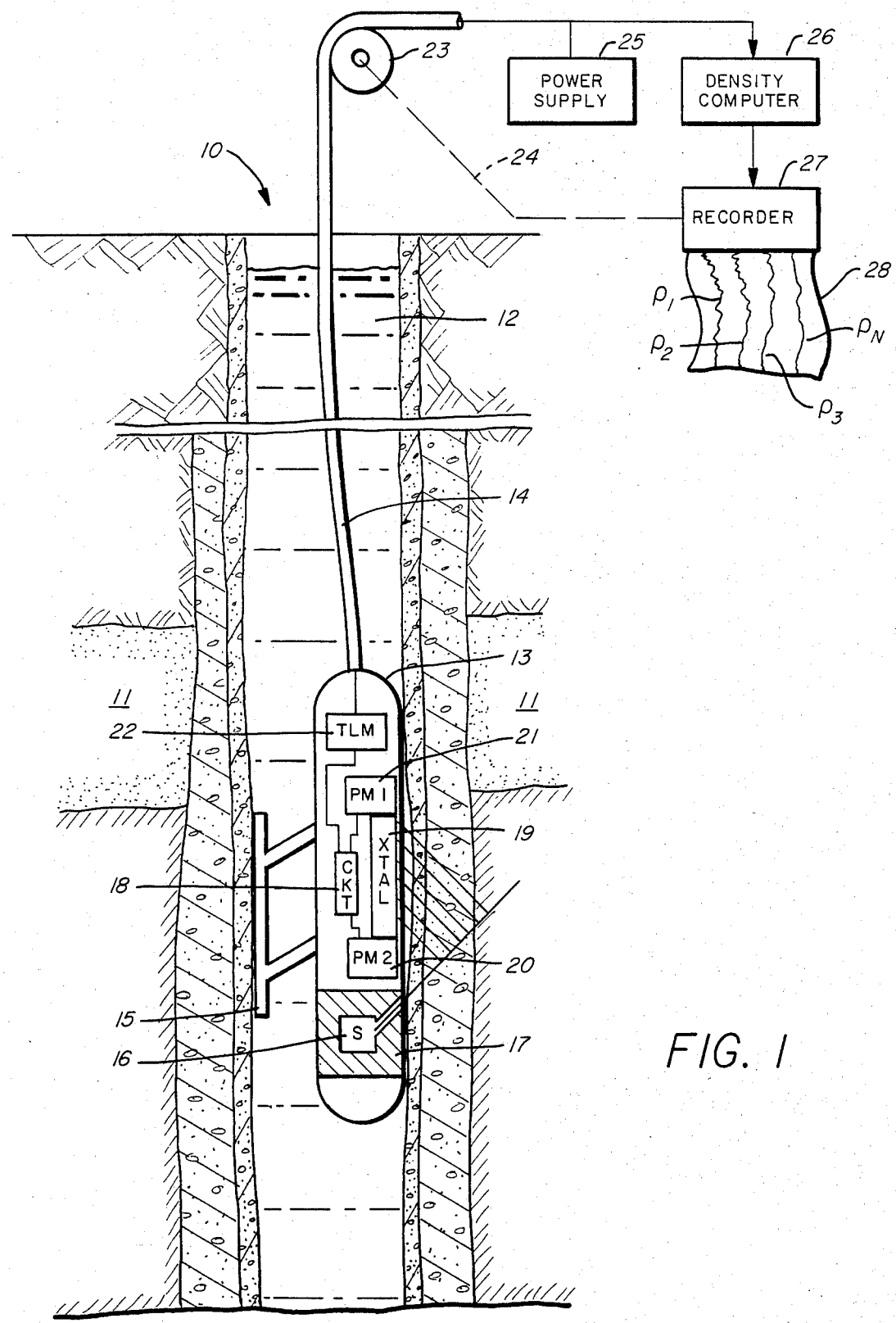
FIG. 1 is a schematic illustration showing a well logging system in accordance with the concepts of the present invention in a well borehole.

Referring initially to FIG. 1, a well logging system in accordance with the present invention is illustrated schematically in a well borehole. A well borehole 10 filled with a borehole fluid 12 penetrates earth formations 11 which have different density characteristics. A fluid tight well logging sonde 13 is suspended in the borehole 10 by a typical multiconductor (or single conductor) armored well logging cable 14. The sonde 13 is eccentered or urged against one wall of the borehole 10 by a backup arm or skid member 15. The sonde is provided near the lower end thereof with a gamma ray source 16 which is collimated by an aperture in a shielding material 17 such as tungsten surrounding the source 16 to emit gamma rays in a preferred direction into the earth formations 11 surrounding the borehole. A position sensitive gamma ray detector comprising photomultipliers 20 and 21 and a scintillation crystal 19 is longitudinally spaced in the downhole sonde above the gamma ray source 16. The photomultipliers 20 and 21 are connected to circuitry 18 and to a telemetry unit 22 in a manner which will be described in more detail subsequently for transmission of signals to the surface of the earth via conductors of the logging cable 14.

At the surface the logging cable 14 passes over a sheave wheel 23 which is electrically or mechanically coupled, as indicated by dashed line 24, to a recorder 27 which moves a record medium 28 as a function of the borehole depth of the downhole measuring instrument or sonde 13. Count rate information from the photomultipliers downhole position sensitive detector 19, 20 and 21 is supplied by conductors of the logging cable 14 to a surface density computer 26 which utilizes the count rate information at different longitudinal distances along the detector crystal 19 from the source 16 to determine the formation bulk density as a function of radial distance from the wall of the well borehole 10 of the earth formation materials surrounding the well borehole. Formation bulk density at different radial distances $\rho_1$, $\rho_2$, $\rho_3$ through $\rho_n$ are plotted on the record medium 28 by the recorder 27 as a function of the borehole depth of the downhole sonde 13.

Power for the operation of the downhole system is provided by a surface power supply 25 which is coupled to conductors of the armored logging cable 14 in a conventional manner.

Figure 2:
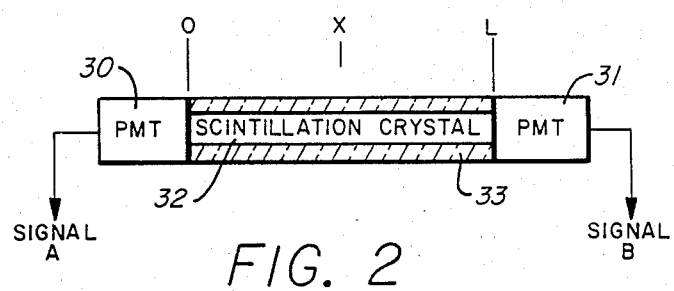
FIG. 2 is a schematic illustration showing a position sensitive gamma radiation detector of one type used in the system of the present invention.

Referring now to FIG. 2, one type of position sensitive scintillation detector which may be used in the gamma gamma density logging system of the present invention is illustrated in more detail but still schematically. A single cylindrical shaped scintillation crystal 32, which may be of the thallium activated sodium iodide type, is illustrated. The scintillation crystal 32 is surrounded by a light absorbent material 33 along the entire length thereof. This is in direct constrast to a typical scintillation detector crystal which would be typically be surrounded by a light reflective medium. Located at each opposite end of the cylindrical scintillation crystal 32 are photomultipliers 30 and 31. The photomultipliers each sense light flashes caused in the scintillation crystal by gamma rays impinging thereon and produce output voltage pulses whose voltage level is proportional to the intensity thereof. Each such light flash will provide an output voltage signal from each of the two photomultipliers 30 and 31. The output signal amplitude from photomultiplier 30 is labelled signal "A" in FIG. 2 and the output signal amplitude from photomultiplier 31 is labelled signal "B" in FIG. 2. A reference end of the crystal 32 is taken as zero at the end on which photomultiplier 30 is attached and optically coupled thereto, and an output signal location "L" is indicated at the opposite end of the scintillation crystal to which photomultiplier 31 is attached. It may be shown that a gamma ray impinging on the crystal at an arbitrary position or location "X" of FIG. 2 along its length may be located (i.e. the distance "X" between 0 and L may be determined) from the expression of equation 1.

$$X = \frac{L}{1 + \sqrt{A/B}} \quad (1)$$

Equation 1 is valid where the length of the crystal is large relative to its diameter.

In equation 1 "X" represents the position of the scintillation event along the crystal, L represents the length of the crystal, A the amplitude of the signal received at end A, and B the amplitude of the signal received at end B. The expression of equation 1 based on the scintillation crystal being surrounded by a light absorbing medium and wherein geometrically spherical spreading of the light from a point scintillation event occurring in the crystal is used. An inverse squared attenuation function due to sperical spreading is assumed in the derivation of this expression.

Figure 4:
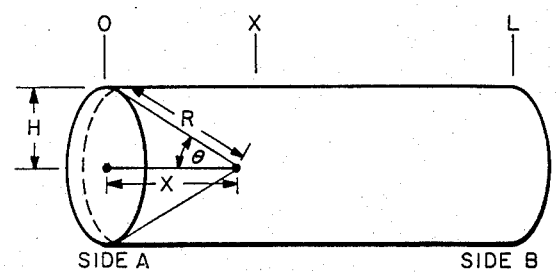
FIG. 4 is a schematic diagram illustrating the geometry of spreading wavefronts of light in a cylindrical scintillation crystal used in one type of detector in accordance with the present invention.

Referring now to FIG. 4, the geometry of a more realistic situation is illustrated schematically. In the diagram of FIG. 4 it is not assumed that the length of the cylindrical crystal is large relative to its diameter. The magnitude of the signal received at the end of the crystal in this instance includes the relationship between proximity of the gamma ray event in the crystal to the end of the crystal and the solid angle covered by the crystal end and viewed by the photomultiplier. A gamma ray event occurring as a point source at "X" in the crystal of FIG. 4 will have distributed its scintillated light over a sphere radius "R" by the time the light reaches the end "A". The surface area of this sphere is $4\pi R^2$. The surface area of the end of the cone formed by the end of the crystal and the sphere is $2\pi R^2(1-X/R)$. Therefore the portion of light that reaches the end of the crystal is $\frac{1}{2}-X/2R$.

$$\text{Now since } R = \sqrt{X^2 + H^2}, \text{ then it can be shown that:} \quad (2)$$

$$A = E[\tfrac{1}{2} - X/(2\sqrt{(X^2 + H)^2}] \text{ and} \quad (3)$$

$$B = E[\tfrac{1}{2} - (L - X)/(2[\sqrt{(L - X)^2 + H^2}])] \quad (4)$$

where E is the energy (amplitude) of the original gamma ray event in the crystal at position X from the reference end. By solving simultaneous equations 3 and 4 just given, X and E may be determined as a function of A, B, H, and L. Here A and B are the same nomenclature as previously described, and H and L refer to the radius of the crystal and the length of the crystal as illustrated in FIG. 4.

Circuitry 18 of the system FIG. 1 quantitatively digitizes the amplitude of the output signals from the two photomultipliers placed at opposite ends of the crystal and transmits this information via telemetry circuit 22 to the surface density computer 26. The density computer 26 using the relationship of equation 1, or alternatively, solving simultaneous equations 3 and 4 may then be used to compute the distance X along the scintillation detector crystal at which the scintillation event occurs and energy E of the event. Thus, the distribution or position of the gamma rays impinging upon the crystal may be determined for each scintillation event which occurs in the crystal. The density computer 26 may be utilized to combine these according to predetermined relationships between the count rates at different distances along the crystal in the manner described in the aforementioned patent using the typical "spine and ribs" crossplots to provide compensated density measurements at different radial distances away from the well bore.

Figure 3:
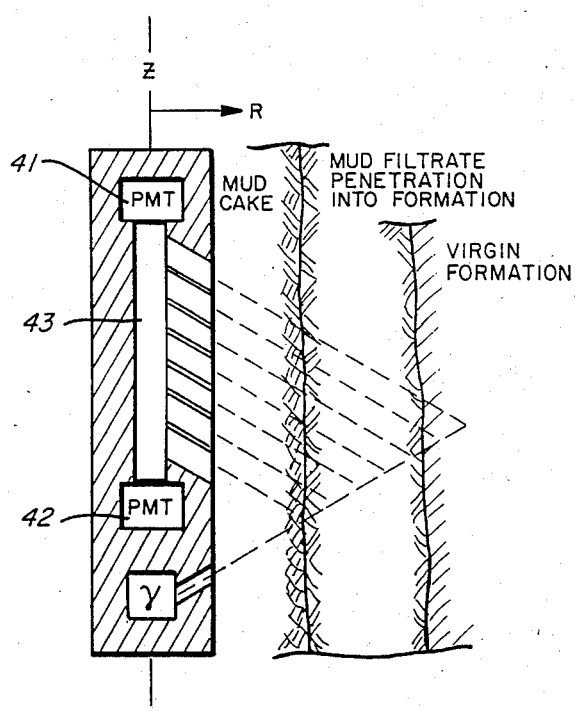
FIG. 3 is a schematic diagram illustrating the position sensitive radiation detector of FIG. 2 in position against the wall of a well borehole and showing a gamma ray source and collimators used in the system.

Referring now to FIG. 3, a position sensitive detector of the type shown in FIG. 2 in position along the wall of a well borehole is illustrated schematically. Note that in FIG. 3, R refers to the radial distance from the center line or axis, "Z", of the detector into the earth formation surrounding the well bore. The scintillation crystal 43 is provided at opposite ends thereof with photomultipliers 41 and 42 which may be of the type previously described. A gamma ray source labelled γ in FIG. 3 and which may comprise a cesium 137 source is collimated to distribute gamma rays in a preferential directional into the earth formations surrounding the borehole. A mudcake layer and a mud filtrate penetration layer in virgin formation is illustrated in FIG. 3. A shielding material such as tungsten (shaded) is provided with collimation slots and allows scattered gamma rays from different radial distances R into the earth formation to be scattered back onto different longitudinal positions along the scintillation crystal 43 of the position sensitive radiation detector. Count rates at different longitudinal locations along the crystal may be used in the manner previously described with respect to the afore-mentioned U.S. patent to determine formation bulk density at the different radial distances into the earth formation corresponding to the mudcake, the mud filtrate invaded layer and the virgin formation. Thus, the thicknesses of the mudcake and the filtrate invaded zone may be determined using the techniques of the present invention.

Rather than using a clear, completely optically transparent scintillation crystal surrounded by a light absorbent material in the detector type shown in FIG. 2 and relying on attenuation by spherical spreading of a wavefront, the same principle for determining position along the crystal could be used in another embodiment of this type of detector. A light absorbent or "cloudy" crystal having a known absorption characteristic per unit of length could be used. Light absorption in the crystal could be provided by doping the thallium activated sodium iodide crystal during its manufacture with a dye having the desired absorptive properties as a function of optical path length. This tailored absorptive property could be thought of as "forced absorption" as opposed to "natural absorption" which occurs in a spreading spherical wavefront. Appropriate expressions for X and E analagous to Equations 3 and 4 could then be derived based on this absorptive characteristic plus spherical spreading if the crystal were surrounded by on light absorptive medium or by the forced absorptive light charactertistic alone if the crystal were surrounded by an efficient light reflective medium. This type of development can lead to a second, different type of position sensitive detector for use in the system of the present invention which is illustrated in FIG. 5.

Figure 5:
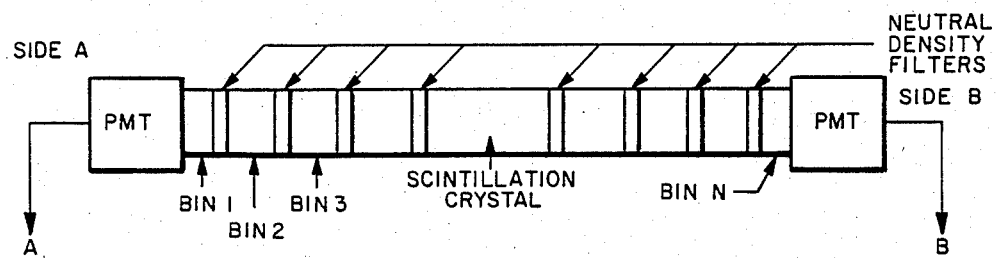
FIG. 5 is a schematic diagram illustrating a second type of position sensitive scintillation detector which may be utilized in a system according to the concepts of the present invention.

Referring now to FIG. 5, a different type of position sensitive radiation detector which may be utilized in a gamma ray density logging system according to the concepts of the present invention is illustrated. In the detector of FIG. 5, a cylindrical scintillation detector comprising plural cylindrical crystals is divided into bins labelled bin 1, bin 2, bin 3,—to bin N along the length thereof by a plurality of neutral density filters as shown. This array of separate scintillation crystals, which may be of the optically transparent thallium activated sodium iodide type, is provided at each end thereof with photomultiplier tube detectors (labelled PMT) and having output voltage signals A and B. The position along the length of the scintillation detector array of a gamma ray event may be determined by taking the ratio of the amplitude of the signals from the two photomultipliers. In this case the ratio response will appear as a stair step function by the action of the neutral density filters on the light generated within the scintillation crystal.

In the detector shown in FIG. 5, it is not necessary to surround the scintillation crystals with a light absorbant medium. In this type of detector the scintillation crystal may be surrounded by a conventional light reflecting medium. Thus, a high light retention efficiency maybe achieved by this type of detector with the loss of light intensity resolution being limited to that provided by the absorption of light by the neutral density filters. A gamma ray scintillation event occurring in a particular bin along the length of the scintillation crystal will be characterized by a particular ratio of signal A/B output from the photomultipliers. The particular characteristic step on the stair step function (shown in FIG. 6) relating the ratio of signal A to signal B will characterize which particular bin (from 1 to N) of the scintillation crystal at which the scintillation event occurs. It will also be noted in the detector of FIG. 5 that there is no constraint placed on having the size of the different bins formed by the neutron density filters be the same. These bins may be whatever size is desired and are defined only by the absorptive action or forced absorptive function of the neutral density filters. If the absorption function of each filter is known then the original amplitude of the scintillation event may be reconstructed in a straightforward manner from the individual PMT output of either photomultiplier, thus preserving the energy E information of the original gamma ray event.

Figure 6:
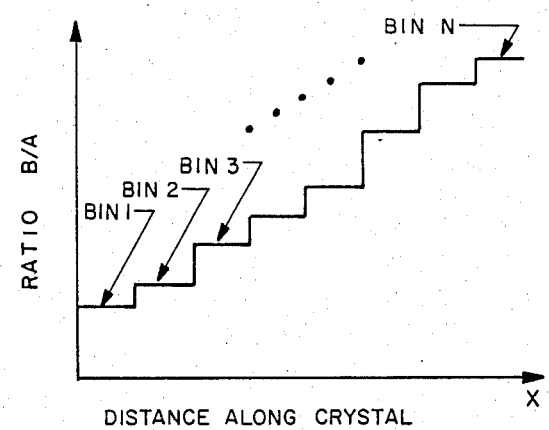
FIG. 6 is a graphical representation of the output voltages ratio of a detector such as shown in FIG. 5.

The stair step function relating the distance along the scintillation crystal to the amplitude ratio A/B is illustrated in FIG. 6. In deriving this function, it is assumed that the material within a bin does not significantly absorb light and that the surrounding reflecting surface around the cylindrical crystal is very efficient. Thus, the only absorption in the light reaching either of the photomultiplier tubes is that which occurs because of the absorption of the neutral density filters.

The foregoing descriptions may make other alternative embodiments according to the concepts of the inventions apparent to those skilled in the art. It is the aim of the appended claims to cover all such changes and modifications as fall within the true spirit and scope of the invention.

We claim:

1. A system for measuring properties of earth formations in the vicinity of a well borehole at a plurality of different radial distances from the borehole, comprising:

a fluid tight hollow body member sized and adapted for passage through a well borehole and housing therein;

a source of gamma rays and means for directing gamma rays from said source outwardly from said body member into earth formations in the vicinity of the borehole; and a position sensitive scintillation detector for detecting gamma rays scattered back into said body member from the earth formation in the vicinity of the borehole, means for collimating said scattered gamma rays onto said detector, said detector comprising scintillation crystal means having a plurality of discrete longitudinally spaced active regions or bins and being longitudinally spaced from said gamma ray source and having a longitudinal length L and two opposite ends and having photomultiplier tubes optically coupled to said opposite ends for providing output voltage signals having voltage amplitudes A and B representative of the intensity of scintillation events occurring in said crystal and impinging at said opposite ends thereof, means separating said bins for selectively attenuating light passing therebetween, and means for combining said output voltage signals A and B according to a predetermined relationship to derive the discrete bin along said length L of each of said scintillation events in said crystal, thereby providing measurements of the gamma ray scattering properties of the earth formations at different radial distances from the borehole.

2. The system of claim 1 wherein said scintillation crystal means is overall generally of a right circular cylinder shape.

3. The system of claim 1 wherein said scintillation crystal means are essentially optically transparent and is surrounded on the surface thereof by a light reflective medium.

4. The system of claim 1 wherein said scintillation crystal means has a predetermined discrete step absorptive function for light as a function of optical path length determined by the character of said selective attenuating means separating said active regions of said scintillation crystal means and is surrounded by a light reflective medium.

5. The system of claim 1 wherein the earth formation property to be measured is the formation bulk density.

6. The system of claim 5 wherein said formation bulk density is compensated for material intervening said gamma ray source and said formation by combining bulk density measurements attributable to different radial distances from the borehole according to a predetermined functional relationship.

7. The system of claim 1 and further including means for deriving from said output voltage signals a measure of the energy E of the gamma rays causing said scintillation events.

8. The system of claim 1 and further including means for recording as a function of borehole depth and radial distance from the borehole at a given depth, the earth formation properties being measured.

* * * * *